UNITED STATES PATENT OFFICE.

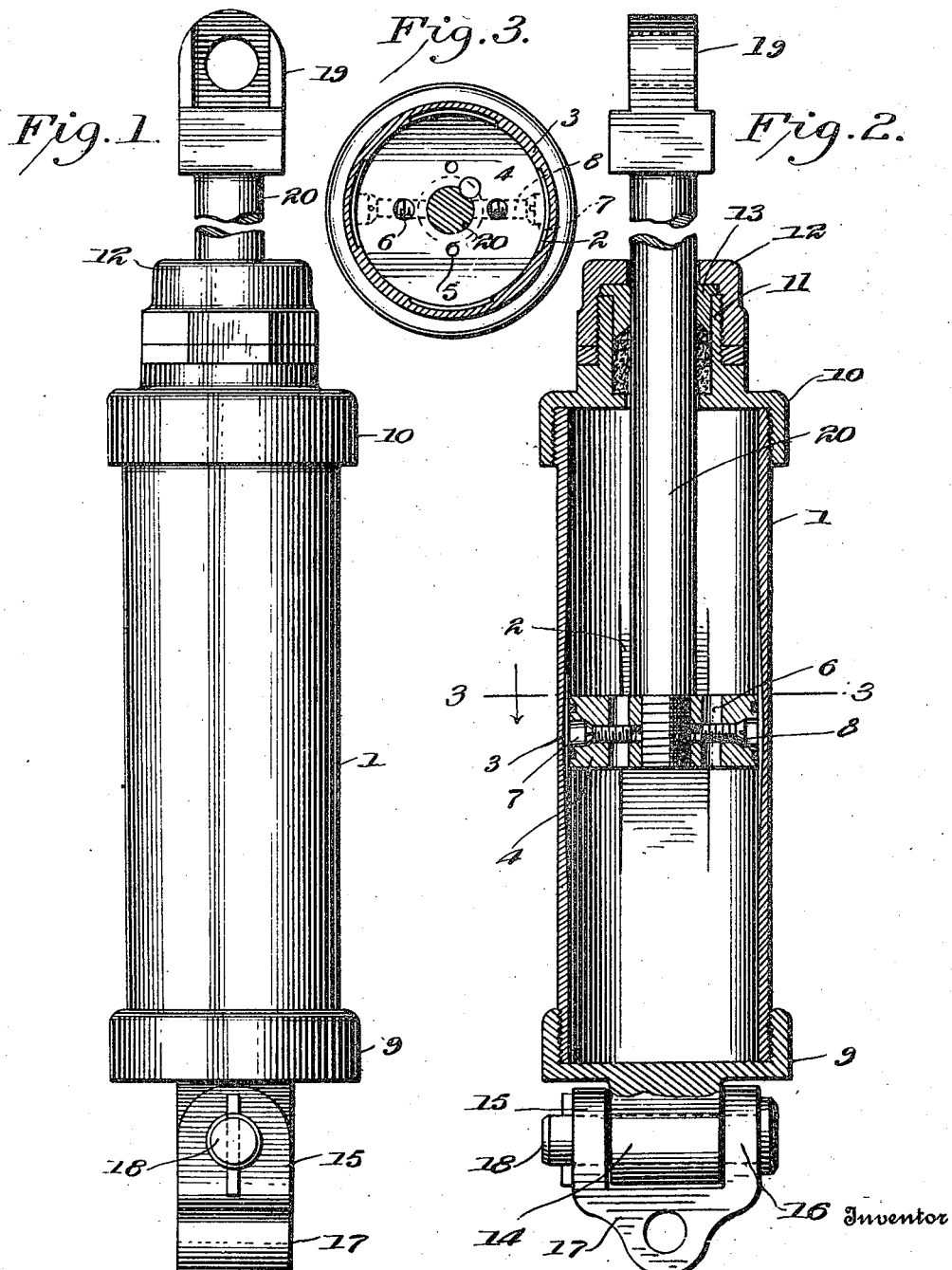

WILLIAM ANDERSON, OF HARRISBURG, PENNSYLVANIA, ASSIGNOR OF ONE-HALF TO GEORGE W. WOODWARD, OF MECHANICSBURG, PENNSYLVANIA.

SHOCK-ABSORBER.

1,185,754.   Specification of Letters Patent.   Patented June 6, 1916.

Application filed February 24, 1915. Serial No. 10,311.

*To all whom it may concern:*

Be it known that I, WILLIAM ANDERSON, a citizen of the United States, residing at Harrisburg, in the county of Dauphin and State of Pennsylvania, have invented new and useful Improvements in Shock-Absorbers, of which the following is a specification.

This invention relates to shock absorbers and more particularly to a fluid type wherein means is provided for increasing the transmission of liquid from one side of the piston to the opposite side of the piston when the latter is passing the center of a cylinder within which the piston reciprocates.

Another object of the invention is the provision of a structure wherein permanent means is provided for limiting the rapidity in which the fluid passes from one side of the piston to the other and also provides control means for coöperation with the permanent means for taking care of heavy or light service.

A further object of the invention is the provision of a cylinder having spaced recesses formed in the central portion of its inner surface, the depth of the recesses decreasing toward both extremities of the cylinder.

The invention consists in the features of construction, combination, and arrangement of parts, hereinafter fully described and claimed, reference being had to the accompanying drawings, in which:

Figure 1 is a side elevation of the shock absorber. Fig. 2 is a vertical section therethrough. Fig. 3 is a cross section on line 3—3 of Fig. 2.

Referring to the drawings, the numeral 1 designates a cylinder, the wall of which being of an equal thickness throughout. Cut into the medial portion of the cylinder 1 in any suitable manner are recesses 2, the depth of which decreases from a central portion as shown at 3 toward both extremities of the cylinder. From this arrangement it will be seen that the greatest amount of communication between the upper portion of the cylinder and the lower portion of the cylinder is established when the piston 4 passes through its central position.

The piston 4 is provided with bleed openings 5 for establishing a permanent communication between the upper and lower portions of the cylinder. Alternating with the bleed openings 5 are ports 6 of a capacity much greater than the bleed openings. Intersecting the axis of the ports 6 are horizontally arranged screw threaded passages 7 in which are mounted screws 8 which control the amount of communication between the upper portion of the cylinder and the lower portion of the cylinder through said ports. The extremities of the cylinder 1 are screw threaded so as to coöperate with the threads formed on caps 9 and 10. The cap 10 is provided with a tubular threaded extension 11 which receives the cap 12 of a packing gland 13. The cap 9 is provided with an apertured projection 14 arranged between the parallel limbs 15 and 16 of a yoke 17. Passing through the limbs of the yoke and the apertured projection is a pin 18, this arrangement allowing for oscillatory motion between the cylinder and the support to which the yoke 17 is attached. The other connection for the shock absorber is in the form of an eye 19 formed integral with the upper portion of the piston rod 20 which has screw threaded engagement with the piston.

What is claimed is:

In combination, a cylinder, a piston having a series of longitudinal extending passages, and a series of transverse threaded passages intersecting said first passages and screws each mounted in a transverse passage and adapted to obstruct one of said longitudinal passages, the heads of the screws being counter-sunk into the side of the piston.

In testimony whereof I affix my signature in presence of two witnesses.

WILLIAM ANDERSON.

Witnesses:
LEVI DETTLING,
WILLIAM DANNER.